United States Patent [19]

Garrett

[11] 4,340,159
[45] Jul. 20, 1982

[54] APPORTIONING CONTROL APPARATUS TO CONTROL MEASURED DISPENSING

[76] Inventor: Arthur E. Garrett, P.O. Box 204, Caldwell, Id. 83605

[21] Appl. No.: 172,699

[22] Filed: Jul. 28, 1980

[51] Int. Cl.³ .................... G01F 11/06; G01F 13/00
[52] U.S. Cl. .................................. 222/389; 222/250
[58] Field of Search ............ 222/249, 250, 262, 334, 222/389; 91/40

[56] References Cited

U.S. PATENT DOCUMENTS

| | | | |
|---|---|---|---|
| 2,593,889 | 4/1952 | Kahl et al. | 222/250 |
| 2,908,424 | 10/1959 | Illsley | 222/250 |
| 3,292,824 | 12/1966 | Arp et al. | 222/250 |

FOREIGN PATENT DOCUMENTS 972064  6/1952  France ................................. 222/250

*Primary Examiner*—David A. Scherbel
*Attorney, Agent, or Firm*—Paul F. Horton

[57] ABSTRACT

Apportioning control apparatus used principally for metering and dispensing foodstuff, said apparatus including an apportioner housing having an internal bore containing a free-floating piston, and an inlet and outlet port located adjacent both ends of the housing and opening into the bore. Working fluid is contained within the bore on both sides of the piston. Intake and discharge of the working fluid from the bore is controlled by a plurality of switch activated valves, permitting simultaneous intake and discharge. An adjustable piston stop permits precision control of the volume of working fluid flowing to and from the apparatus. The apparatus may include a holding tank for the working fluid, a pump, and a foodstuff dispenser operable to dispense foodstuff in a volume equal to fluid intake from the apportioner.

2 Claims, 3 Drawing Figures

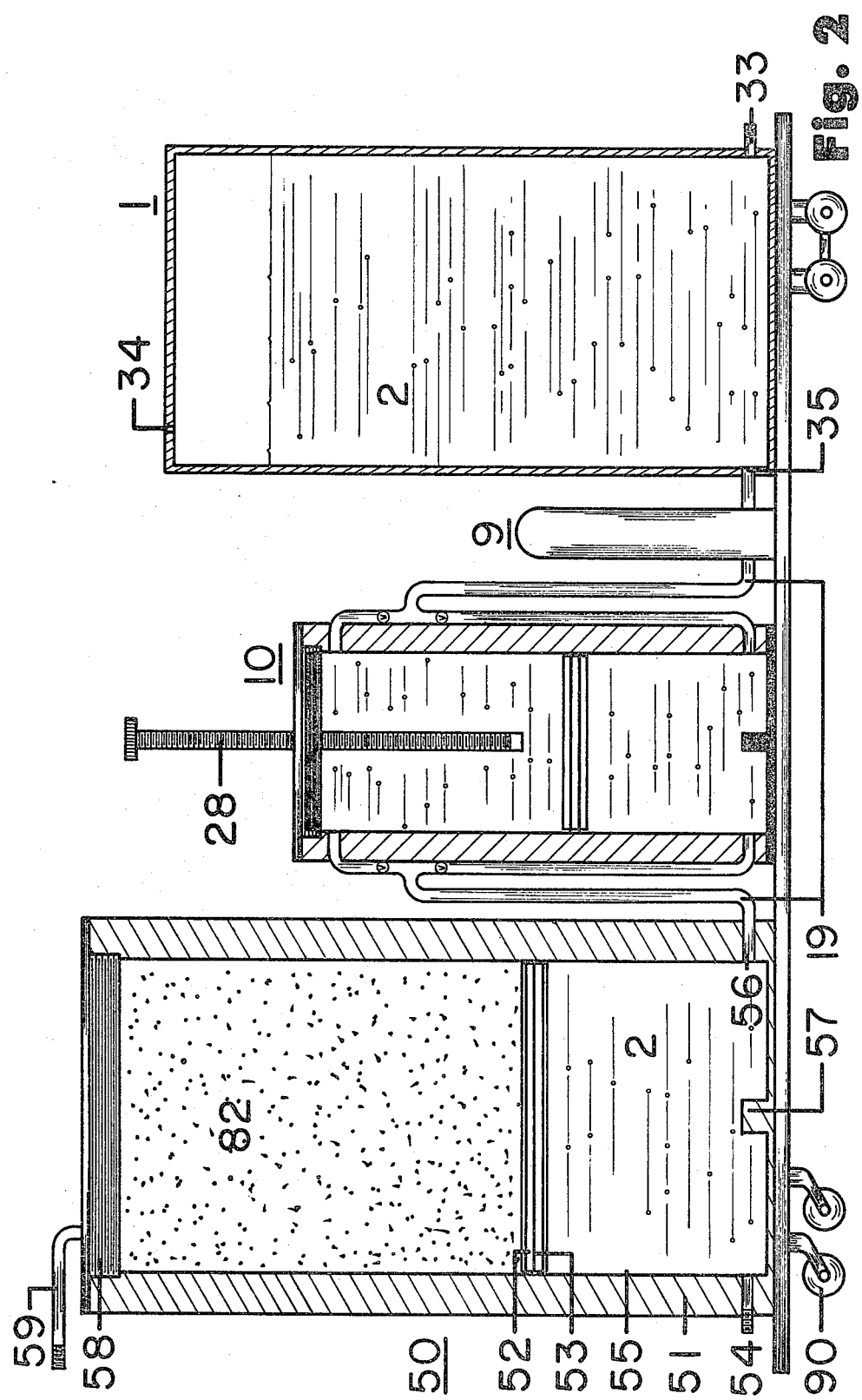

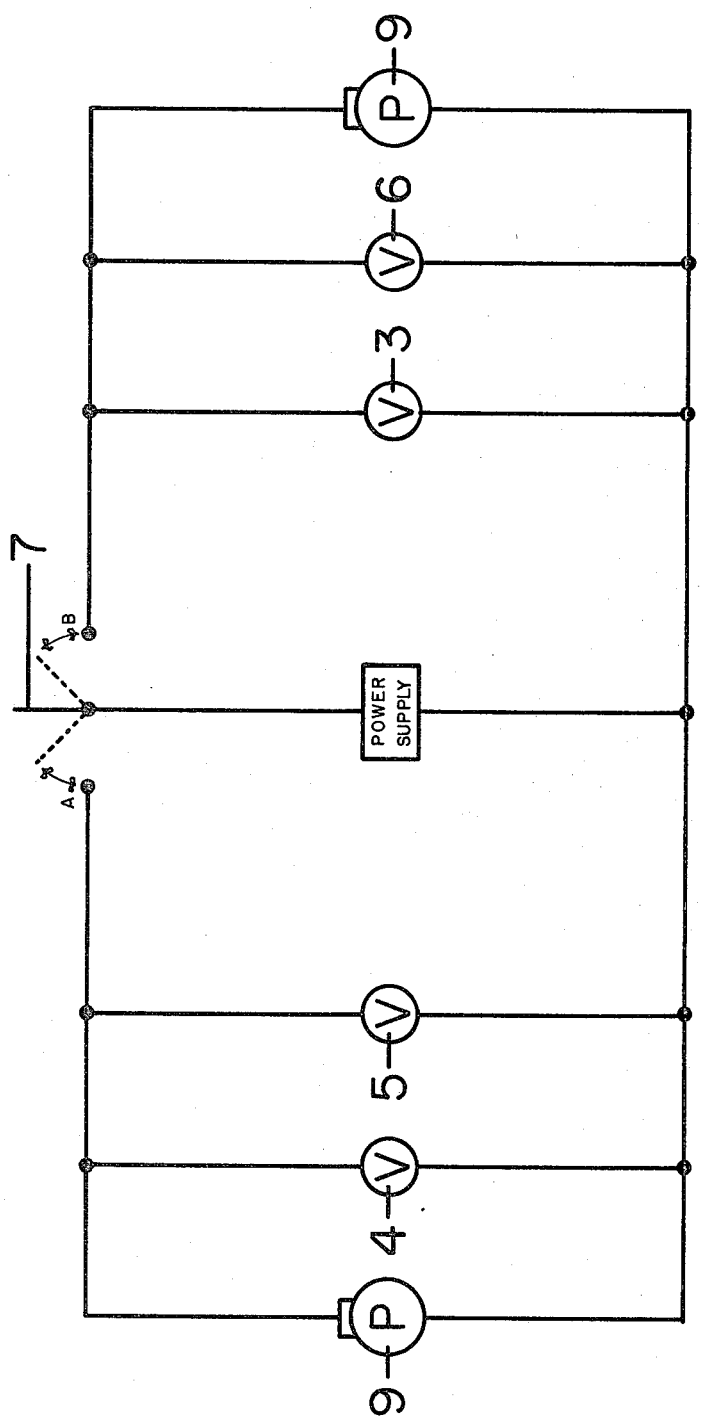

APPORTIONING CONTROL APPARATUS TO CONTROL MEASURED DISPENSING

BACKGROUND OF THE INVENTION

1. Field of the Invention

This invention relates generally to apparatus for apportioning fluid and viscous materials and, more particularly, to an apportioner control device for foodstuffs.

2. Background of the Invention

Apportioning devices for the apportioning of viscous products are well known and apportioning apparatus for the apportioning of foodstuffs are known in the food industry. Commonly, apportioning is based upon either rate of flow or displacement of the product from a displacement container of known volume.

In the food industry, the state of the art is well typified by U.S. Pat. Nos. 3,162,894 issued to K. A. Hutchins et al; 3,883,925 issued to J. Muller; and 4,032,049 issued to G. F. Roberts. Hutchins illustrates the use of an impeller type meat pump driveable at varying speed for filling the casing. Muller discloses a mechanically driven piston of predetermined displacement for metering of viscous substances and Roberts discloses a metering pump, of intermeshing helical gears, fed by a conventional auger. Problems associated with prior art apportioning devices include the agitation of previously ground products, especially meat, resulting in the break down of fibrous tissue further resulting in a mushy end product; inability to precisely control the volume dispensed; inability or difficulty in adjusting the specific volume of products dispensed; and inability of a single apportioner to control the dispensing of products having a wide variance in viscosity—such as a liquid or a paste. Another primary disadvantage of existing apportioners in the food industry is the contact between the apportioner and the product being dispensed requiring meticulous cleaning of hard-to-reach parts.

SUMMARY OF THE INVENTION

The present invention comprises, generally, apportioning control apparatus including a cylindrical housing with a free-floating piston controlled by an adjustable piston stop. A plurality of switch activated valves control the flow of a working fluid to and from the cylinder. A more precise definition may be found in the appended claims.

It is therefore a primary object of the present invention to provide apportioning control apparatus which is physically separated from the product to be dispensed.

It is also an important object of the present invention to provide apportioning control apparatus for the dispensing of precise volumes of products of varying viscosity.

Another object of the present invention is to provide apportioning control apparatus which preserves the physical integrity of the product being dispensed.

Additional objects and advantages will become apparent and a more thorough and comprehensive understanding may be had from the following description taken in conjunction with the accompanying drawings forming a part of this specification.

BRIEF DESCRIPTION OF THE DRAWINGS

FIG. 2 is an elevational view of the apportioner, fluid container and dispenser of the present invention showing in dotted lines the free-floating pistons.

FIG. 3 is an electrical schematic showing switch activation of the pump and selected valves.

DETAILED DESCRIPTION OF THE INVENTION

Figure 1:
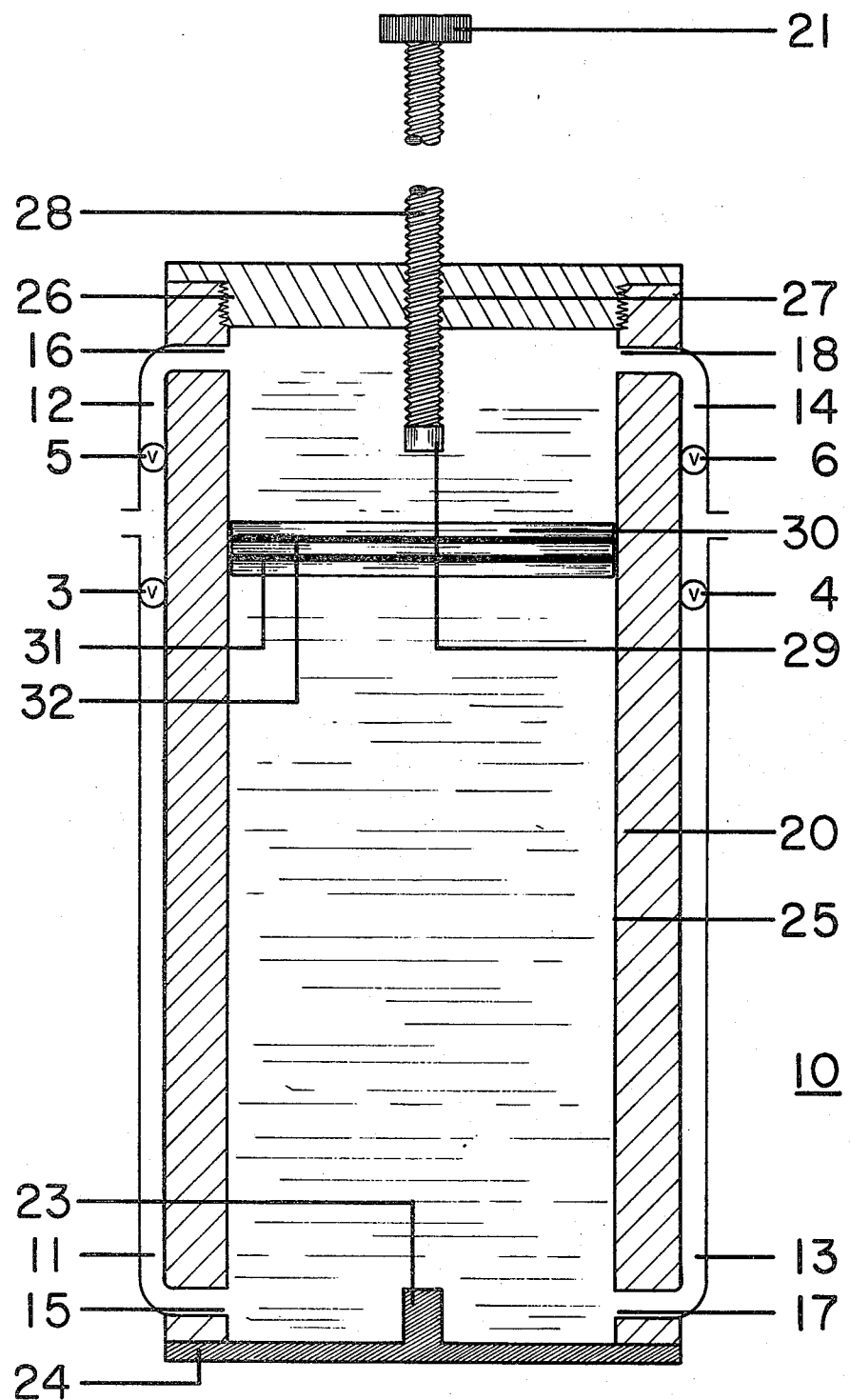
FIG. 1 is a sectional view of the apportioner of the present invention.

Referring now to the drawings and particularly FIG. 1, it will be seen that apportioner 10, made according to the present invention includes generally a cylindrical housing 20 having an internal bore 25 and a free-floating piston 30 engaging the walls of the bore. The housing and piston may be constructed of any suitable material, preferably stainless steel. The piston may be provided with a pair of O-rings 31 and 32 contained within vertically spaced grooves in the wall of the piston. The O-rings operate as seals to prevent passage of fluid between the piston and the walls of the bore.

The housing contains, at its lowermost end, a closure member 24 which may be screwed, welded, or otherwise fastened to the housing to prevent fluid escape. Member 24 is provided with an upstanding piston-stop 23 to prevent the piston from closing inlet and outlet ports, as will hereinafter be more fully explained. At its uppermost end, housing 20 includes a second closure member in the form of a threaded cap 26 which engages mating threads on the housing so that the cap may be conveniently removed. The cap may be equipped with an O-ring, about its periphery, or other suitable seal, not shown, in its contact with the housing to prevent fluid loss. Cap 26 is provided, adjacent its center, with a threaded aperture 27 adapted to receive adjustable piston stop 28. Piston stop 28 includes a threaded shaft portion 29 for engaging threaded aperture 27 for vertical movement. Shaft 29 is blunted at its lowermost end for contact with piston 30 and is provided with a handle 21, at its uppermost end, for rotation. It is to be understood that other adjustable stops may also be suitably employed.

Opening into bore 25 adjacent the lowermost end of housing 20 are one or more inlet ports 17 and one or more outlet ports 15 providing fluid communication between the bore and inlet and outlet conduits 13 and 11, respectively. Also opening into bore 25 adjacent the uppermost end of the housing are one or more inlet ports 18 and outlet ports 16 also providing communication between the upper portion of the bore and inlet and outlet conduits 14 and 12, respectively. Each of the conduits is provided with a conventional check valve 4, 3, 6, and 5, respectively, controllable by switch 7 utilizing standard electrical circuitry, as shown in FIG. 3. Valves 4 and 5 are operated together as are valves 3 and 6, providing a fluid inlet to the bore above piston 30 while simultaneously providing a fluid outlet below the piston, or vice versa.

Referring now to FIG. 2, in particular, apportioner 10 is shown as receiving a working fluid 2, as for example oil or water, from a supply source, container 1, and feeding the apportioned working fluid to a dispenser 50, through conduit 19. A pump 9 is operable to force the fluid from the container through the apportioner and into the dispenser. Dispenser 50 includes a cylindrical housing 51 having an internal bore 55 and free-floating piston 52 much in the manner of apportioner 10, but has a much larger volume. Piston 52 is provided with vertically spaced O-rings 53 for sealingly engaging the side wall of the bore to prevent contact between working fluid 2 and the product to be dispensed, as for example, ground meat 82. Housing 51 is sealed at its lower end except for inlet port 56 which permits fluid communication between bore 55 of the dispenser 50 and bore 25 of apportioner 10 by means of appropriate conduits, and spigot 54 opening to atmosphere. A piston stop 57 is also provided to prevent obstruction of the inlet port and of the spigot. The top of the dispenser is provided with a cap 58 which is removably fastened to housing 51 as by threads or clamps. Cap 58 is provided with a dispensing horn 59. The entire apparatus may be mounted on a cart 90 for portability.

In operation and assuming ground meat to be the product to be dispensed, container 1 is filled with a working fluid 2, such as water, by attaching a hose to tap 33. Air within the container is vented through vent 34. Piston stop 28 is then set at a desired depth in bore 25 of apportioner 10, dependent upon the volume of meat wished dispensed from dispenser 50. An appropriate gauge, not shown, may be used to determine piston-stop depth and therefore volume.

Dispenser 50 may then be filled with ground meat 82 by unscrewing cap 58. Piston 52 is forced downward upon stationary piston stop 57 thereby preventing blockage of inlet port 56. Cap 58 is then replaced, spigot 54 opened to the atmosphere and switch 7 flipped to position "b", as shown in FIG. 3, to activate pump 9 and simultaneously open inlet valve 6 and outlet valve 3. Pump 9 forces fluid through outlet port 35 of container 1, through the pump, through valve 6, conduit 14, inlet port 18 and into bore 25 of Apportioner 10 above piston 30. Air and any working fluid below piston 30 is forced through outlet port 15, conduit 11, valve 3, conduit 19 and through inlet port 56 of dispenser 50 and out of spigot 54 to a drain. Piston 30 comes to rest on stationary piston stop 23 preventing obstruction of ports 15 and 17. Switch 7 is then flipped to position "a" to again activate the pump and to open valves 4 and 5, forcing the working fluid into the lower portion of bore 25 of apportioner 10 causing free-floating piston 30 to rise until contact is made with adjustable piston stop 28. Working fluid and air contained in the bore above the piston is forced through valve 5, into the dispenser and also out spigot 54. Repeating this operation several times serves to clear the system of any air that might be present.

Spigot 54 of dispenser 50 is then closed. It will be seen then that any further activation of switch 7 will cause piston 30 of apportioner 10 to raise or lower a prescribed distance depending upon the setting of the adjustable piston stop 28. It is also to be noted that the upward and downward stroke are always equal, the length of the stroke depending upon the setting of the piston stop. Each stroke of piston 30 of apportioner 10 will cause piston 52 of dispenser 50 to raise a prescribed distance forcing a selected volume of the meat through horn 59 and into any casings or containers as may be desired.

Having thus described in detail a preferred selection of embodiments of the present invention, it is to be appreciated and will be apparent to those skilled in the art that many physical changes could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:
1. Apportioning control apparatus comprising:
   a substantially cylindrical apportioner housing sealed at one end and having a removeable sealing member at an opposing end and having an internal bore operable to receive a piston and including at least one inlet port and at least one outlet port, vertically spaced and in fluid communication with the bore;
   a free-floating piston engaging the internal wall of the bore and adapted for reciprocal movement therein;
   an adjustable piston stop mounted at one end of said housing and operable to stop said piston at a preselected distance from the end whereby a measured volume of working liquid may be discharged from the bore;
   a plurality of valves operable to selectively open and close said ports, permitting infusion of working liquid into the bore above or below said piston and a simultaneous draining of a working liquid from the bore on the opposing side of said piston;
   switch means operable to control said valves;
   a working liquid source in fluid communication with the inlet ports of said apportioner housing;
   pump means operable to force working liquid from said source through the inlet ports; and
   food dispensing means in fluid communication with the outlet ports of said apportioner housing, said food dispensing means operable to dispense food in a volume equal to the volume of working liquid received from said outlet ports of said apportioner housing.
2. The apparatus as described in claim 1 wherein said food dispensing means includes:
   a substantially cylindrical housing having an internal bore operable to receive a piston and at least one inlet port opening into the bore adjacent the lowermost end of the bore, the inlet port in fluid communication with the outlet ports of said apportioner housing, and an outlet dispensing port opening into the bore adjacent the uppermost end of the bore; and
   a free-floating piston engaging the bore and adapted for reciprocal movement therein, said piston operable to force food stuff throught the outlet dispensing port.

* * * * *